(12) United States Patent
Murray et al.

(10) Patent No.: US 8,214,098 B2
(45) Date of Patent: Jul. 3, 2012

(54) SYSTEM AND METHOD FOR CONTROLLING SWARM OF REMOTE UNMANNED VEHICLES THROUGH HUMAN GESTURES

(75) Inventors: Paul Murray, Woodinville, WA (US); James J. Troy, Issaquah, WA (US); Charles A. Erignac, Seattle, WA (US); Richard H. Wojcik, Bellevue, WA (US); David J. Finton, Issaquah, WA (US); Dragos D. Margineantu, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 12/395,019

(22) Filed: Feb. 27, 2009

(65) Prior Publication Data

US 2009/0222149 A1    Sep. 3, 2009

Related U.S. Application Data

(60) Provisional application No. 61/032,313, filed on Feb. 28, 2008.

(51) Int. Cl.
*G06F 19/00* (2006.01)
(52) U.S. Cl. ............ 701/23; 701/28; 701/514; 382/103; 382/107
(58) Field of Classification Search .............. 701/23, 701/27, 28, 70, 220, 223, 33.7–34.2, 514; 382/100, 103, 107, 117, 118, 153, 170; 348/95, 348/222.1
See application file for complete search history.

(56) References Cited

U.S. PATENT DOCUMENTS 7,616,233 B2 * 11/2009 Steinberg et al. .......... 348/222.1
8,005,257 B2 *  8/2011 Venetsky et al. ............ 382/100

OTHER PUBLICATIONS

Troy, J.J., Erignac, C.A., Murray, P., "Closed-Loop Motion Capture Feedback Control of Small-Scale Aerial Vehicles", AIAA Infotech@Aerospace Conference, #AIAA-2007-2905, May 10, 2007, pp. 1-14.
Lementec, J-C. and Bajcsy, P., "Recognition of Arm Gestures Using Multiple Orientation Sensors: Gesture Classification", the 7th International IEEE Conference on Intelligent Transportation Systems, Washington, D.C., Oct. 3-6, 2004, pp. 965-970.
Martin, Robert C., UML Tutorial: Finite State Machines, www.objectmentor.com/resources/articles/umlfsm.pdf, 9 Pages, Jun. 1998.
LaViola, J.J., "A Survey of Hand Posture and Gesture Recognition Techniques and Technology", Technical Report CS99 -11, Department of Computer Science, Brown University, Providence, Rhode Island, 1999, 79 Pages.

* cited by examiner

*Primary Examiner* — Richard M. Camby
(74) *Attorney, Agent, or Firm* — Harness, Dickey & Pierce, P.L.C.

(57) ABSTRACT

A method is disclosed for controlling at least one remotely operated unmanned object. The method may involve defining a plurality of body movements of an operator that correspond to a plurality of operating commands for the unmanned object. Body movements of the operator may be sensed to generate the operating commands. Wireless signals may be transmitted to the unmanned object that correspond to the operating commands that control operation of the unmanned object.

20 Claims, 16 Drawing Sheets

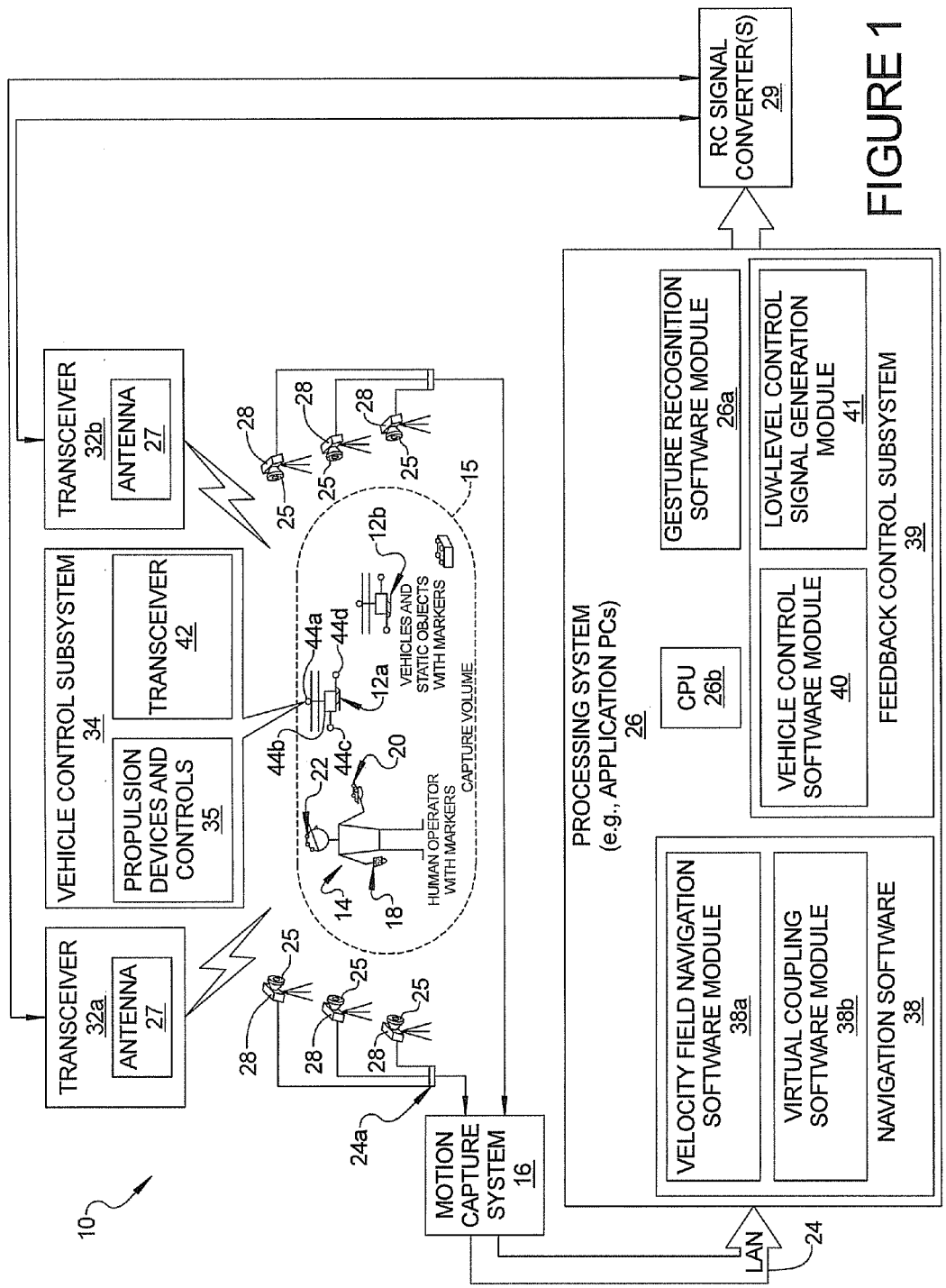

| GESTURE NAME EVENT ACTION | EXAMPLE ILLUSTRATION | |
|---|---|---|
| a. HAND RAISED BEGIN ENTER NORMAL MODE FROM WAIT MODE. | 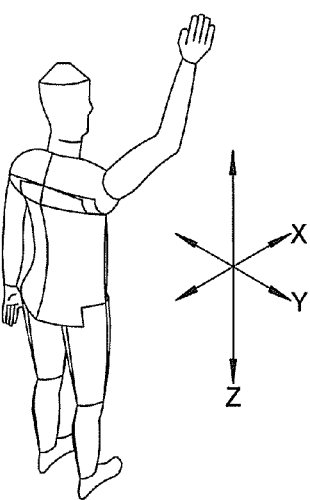 | FIGURE 7 |
| b. POINT NONE THIS GESTURE IS ALWAYS ACTIVE IN NORMAL MODE AND ESTABLISHES THE ORIENTATION OF THE SELECTION CONE. | 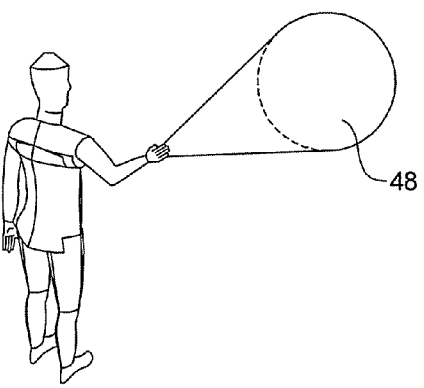 | FIGURE 8 |

| GESTURE NAME<br><br>EVENT<br><br>ACTION | EXAMPLE ILLUSTRATION |
|---|---|
| c. TIME OUT<br><br>TIME OUT<br><br>STOP TRACKING ANY GESTURES FOR THIS SUBJECT INDEPENDENT OF MODE. |  |
| d. TRACK MODE ON<br><br>TRACK MODE ON<br><br>ENTER TRACKING MODE FROM NORMAL MODE. | 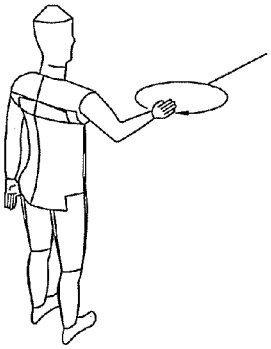 |
| e. TRACK ON<br><br>TRACK ON<br><br>TRACK HAND WITH SELECTED VEHICLES IN TRACK MODE. | 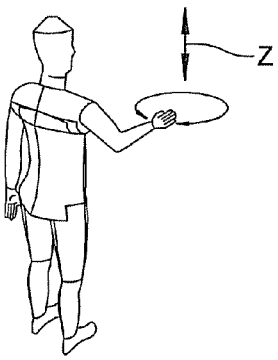 |
FIGURE 9
FIGURE 10
FIGURE 11

| GESTURE NAME<br>EVENT<br>ACTION | EXAMPLE ILLUSTRATION | |
|---|---|---|
| f. TRACK OFF<br><br>TRACK OFF<br><br>STOP TRACKING THE HAND WITH SELECTED VEHICLES IN TRACK MODE. | | FIGURE 12 |
| g. STOP<br><br>STOP<br><br>BRING SELECTED VEHICLES TO A HALT IN NORMAL MODE. | 50 | FIGURE 13 |
| h. MOVE<br><br>MOVE ON<br><br>MOVE SELECTED VEHICLES IN INDICATED DIRECTION IN NORMAL MODE. | 52 | FIGURE 14 |

| GESTURE NAME<br>EVENT<br>ACTION | EXAMPLE ILLUSTRATION | |
|---|---|---|
| i. HEAD NOD<br><br>INCLUDE<br><br>ADD SELECTED VEHICLE TO GROUP IN NORMAL MODE.<br><br>TRACK MODE OFF<br><br>EXIT TRACK MODE AND ENTER NORMAL MODE. | 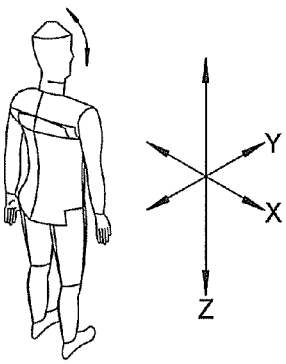 | FIGURE 15 |
| j. HEAD SHAKE<br><br>EXCLUDE<br><br>REMOVE SELECTED VEHICLE FROM GROUP IN NORMAL MODE. | 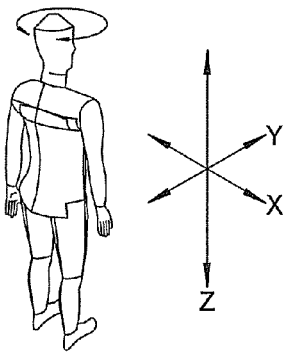 | FIGURE 16 |
| k. NEXT<br><br>NEXT<br><br>ITERATIVELY SELECT VEHICLES IN SELECTION CONE SCANNING LEFT TO RIGHT, TOP TO BOTTOM AND FRONT TO BACK IN NORMAL MODE. | 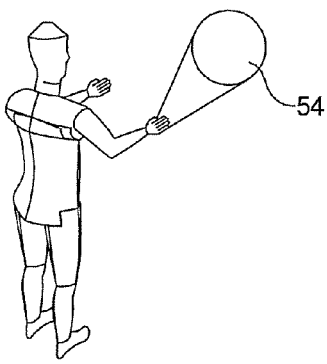 | FIGURE 17 |

| GESTURE NAME<br>EVENT<br>ACTION | EXAMPLE ILLUSTRATION | |
|---|---|---|
| l. PREVIOUS<br><br>PREVIOUS<br><br>ITERATIVELY SELECT VEHICLES IN SELECTION CONE SCANNING BACK TO FRONT, BOTTOM TO TOP AND LEFT TO RIGHT IN NORMAL MODE. | 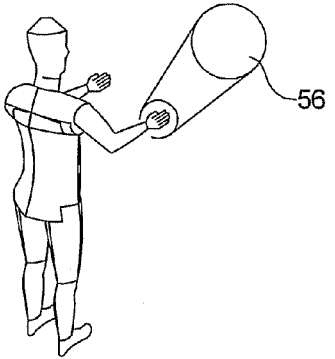 | FIGURE 18 |
| m. GROUP<br><br>GROUP<br><br>GROUP SELECTED VEHICLES INTO A FORMATION IN NORMAL MODE. |  | FIGURE 19 |
| n. UNGROUP<br><br>UNGROUP<br><br>DISPERSE VEHICLES FROM A FORMATION IN NORMAL MODE. |  | FIGURE 20 |

SYSTEM AND METHOD FOR CONTROLLING SWARM OF REMOTE UNMANNED VEHICLES THROUGH HUMAN GESTURES

CROSS REFERENCE TO RELATED APPLICATIONS

The present application claims priority from U.S. Provisional Patent Application Ser. No. 61/032,313, filed Feb. 28, 2008, the disclosure of which is hereby incorporated by reference into the present application.

FIELD

The present disclosure relates to systems and methods for controlling remotely operated vehicles, and more particularly to systems and methods for enabling human gestures to be used to control various operations of remotely operated unmanned vehicles.

BACKGROUND

The statements in this section merely provide background information related to the present disclosure and may not constitute prior art.

At the present time there is significant interest in the use of remote, unmanned vehicles for various surveillance and exploration activities. The use of remotely controlled, unmanned vehicles enables searching, surveillance and exploration operations to be carried out in situations or environments that might be too dangerous or hazardous for human piloted vehicles. Such applications might include battlefield applications to survey movements of equipment or individuals, or surveillance of fixed structures such as dams, bridges, power plants, or any other area of interest. Further applications might include the exploration of areas contaminated with fallout from biological or chemical weapons. Still further applications may involve the exploration of areas such as caves, the interiors of buildings, mountainous regions, or any other geographic area where movement by human piloted vehicles would be difficult, impossible or unnecessarily hazardous to humans.

The control of remotely operated unmanned vehicles has traditionally relied on the use of joystick-based user interfaces. This type of user interface typically allows only one-to-one control of a single unmanned vehicle. Put differently, the joystick-based control system typically requires a single individual to monitor and control the motion of a single unmanned vehicle. The joystick-based interface typically controls the unmanned remote vehicles through direct actuator and motor control. The vehicle motion is accomplished by varying servo actuators for direction control and drive motors that can produce thrust in the case of aerial vehicles, or wheel rotation for ground vehicles. In the case of aerial vehicles, or wheel rotation for ground vehicles. The use of any form of joystick controlled vehicle also typically requires considerable practice with the joystick control device by the individual before the individual becomes proficient at maneuvering the unmanned vehicle.

SUMMARY

In one aspect the present disclosure relates to a method for controlling at least one remotely operated unmanned object. The method may involve defining a plurality of body movements of an operator that correspond to a plurality of operating commands for the unmanned object. Body movements of the operator may be sensed to generate the operating commands. Wireless signals may be transmitted to the unmanned object that correspond to the operating commands that control operation of the unmanned object.

In another aspect the present disclosure relates to a method for controlling operation of an unmanned vehicle. The method may comprise providing an unmanned vehicle having a plurality of optically reflective markers thereon. At least one gesture of a body part of an operator may be defined that corresponds to an operating command for controlling motion of the unmanned vehicle. An article worn by an operator, the article having optically reflective markers, may be used to enable the operator responsible for remotely controlling operation of the unmanned vehicle to signal the gesture through movement of the article. Optical signals may be directed at the unmanned vehicle and the article worn by the operator. Sensed reflections of optical signals from the markers of the unmanned vehicle and the markers on the article may be obtained. A motion capture system may be used to interpret the sensed reflections of the optical signals and to generate data representing a position of the unmanned vehicle and a motion of the article. Processing of the data may be performed to interpret the gesture being given by the operator via motion of the article and to determine a position of the unmanned vehicle, and to generate a command for controlling the unmanned vehicle in accordance with the gesture. The command may be wirelessly transmitted to the unmanned vehicle.

In another aspect the present disclosure relates to a system for remotely controlling at least one unmanned vehicle through body movements of an operator. The system may comprise an article worn on a body part of the operator, the article having a first plurality of optically reflective markers secured thereto. A second plurality of optically reflective markers may be secured to the unmanned vehicle. A motion capture system may be used for wirelessly tracking a position and an orientation of the article via the first plurality of optically reflective markers, and a position and orientation of the unmanned vehicle via the second plurality of optically reflective markers, and generating data representing positions of each of the optically reflective markers. A processing system, adapted to process the data from the motion capture system, may be used to generate commands for controlling motion of the unmanned vehicle. The processing system may include a gesture recognition module for interpreting portions of the data received from the motion capture system that define positions and orientations of the markers on the article being worn by the operator, as predefined operating commands to be provided to the unmanned vehicle. The processing system may also include a feedback control subsystem that receives the command signals from the gesture recognition module and generates low-level vehicle control commands for controlling the unmanned vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a block diagram of one embodiment of a system in accordance with the present disclosure;

FIG. 6 is a view of an operator wearing the two gloves and head piece, and showing the three dimensional coordinate system associated with each of the two gloves, the head piece, as well as the three dimensional coordinate system for the UAV and a world coordinate system that the all the other coordinate systems are keyed to;

FIG. 7 is a perspective drawing of an operator issuing a Hand Raised command that may be used with the present system;

FIG. 8 is a perspective drawing of an operator issuing a Point command that may be used with the present system;

FIG. 9 is a perspective drawing of an operator issuing a time-out gesture that may be used with the present system;

FIG. 10 is a perspective drawing of an operator issuing the Point command Track Mode On command that may be used with the present system;

FIG. 11 is a perspective drawing of an operator issuing the Track On command that may be used with the present system;

FIG. 12 is a perspective drawing of an operator issuing the Track Off command that may be used with the present system;

FIG. 13 is a perspective drawing of an operator issuing the Stop command that may be used with the present system;

FIG. 14 is a perspective drawing of an operator issuing type of Move command that may be used with the present system;

FIG. 15 is a perspective drawing of an operator issuing the Head Nod command that may be used with the present system;

FIG. 16 is a perspective drawing of an operator issuing the Head Shake command that may be used with the present system;

FIG. 17 is a perspective drawing of an operator issuing the Next command that may be used with the present system;

FIG. 18 is a perspective drawing of an operator issuing the Previous command that may be used with the present system;

FIG. 19 is a perspective drawing of an operator issuing the Group command that may be used with the present system;

FIG. 20 is a perspective drawing of an operator issuing the Ungroup command that may be used with the present system;

DETAILED DESCRIPTION

Figure 3:
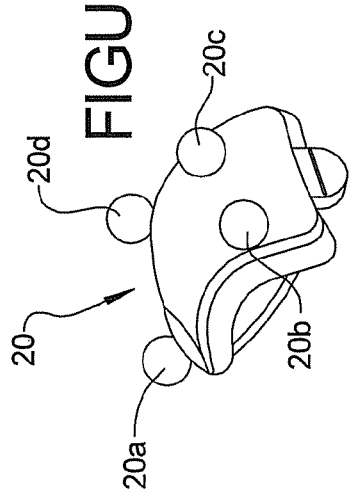
FIG. 3 is a perspective view of an article that may be worn as a glove on the right hand of an operator.

The following description is merely exemplary in nature and is not intended to limit the present disclosure, application, or uses. Referring to FIG. 1 there is shown a system 10 for controlling the motion of objects 12. The objects 12 may operate within a defined or enclosed environment 15. At least one operator 14 present within the environment 15 may wirelessly control operation (i.e., flight) of the objects 12 through human gestures. The objects 12 may be autonomous vehicles, and in this example the objects 12 are illustrated as autonomous, unmanned airborne vehicles, and more specifically as rotorcraft 12a and 12b (hereinafter referred to simply as UAVs 12). However, it will be appreciated that virtually any type of object may potentially be controlled using the teachings discussed herein. For example, objects such as robots in a manufacturing operation may be controlled using the teachings of the present application. Virtually any form of mobile land, air or marine (surface or underwater) vehicle is contemplated as being within the scope of the present disclosure. Also, while only two UAVs 12a and 12b are illustrated, it will be appreciated that a greater or lesser plurality of UAVs 12 may be controlled. In practice it is anticipated that hundreds or more UAVs 12 may be controlled by a single individual, both as a single group or as a plurality of subgroups.

It will also be appreciated that while a single operator 14 is illustrated in FIG. 1 for controlling the UAVs 12, that two or more operators may be used to control the UAVs. For example, one operator may be designated to control a first subplurality of the UAVs 12 while the second operator controls a different subplurality. It is also possible that each of two or more operators may be provided with the capability to control any one or more of the UAVs 12 whether they are operating as a single group or as a plurality of subgroups.

In FIG. 1 the system 10 further includes an object tracking system, that in one embodiment may comprise a commercially available motion capture system 16. The motion capture system 16 may use passive retro-reflective markers, to be discussed momentarily, that are attached to the tracked UAVs 12. The motion capture 16 may also be used for wireless real time monitoring (i.e., essentially continuous and instantaneous monitoring) of the position and orientation of body parts of the operator 14.

Figure 2:
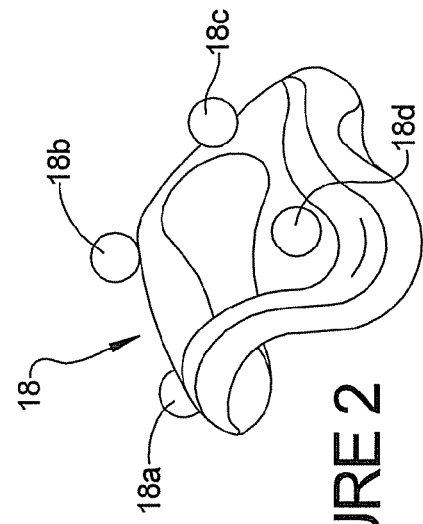
FIG. 2 is a perspective view of an article that may be worn as a glove on the left hand of an operator.
Figure 4:
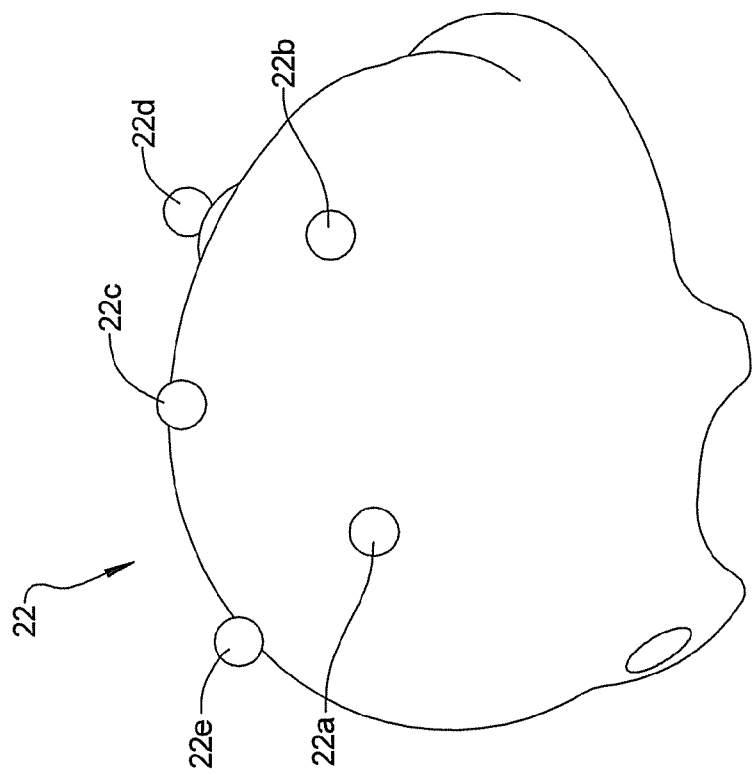
FIG. 4 is a perspective view of an article that may be work has a head piece on the head of an operator.

The system 10 may also include a plurality of articles that may be worn by the operator 14 and which are monitored for position and orientation by the motion capture system 16. In the present example, the articles may involve a right glove 18 worn on the right hand of the operator 14 as shown in detail FIG. 2, a left glove 20 worn on the left hand of the operator 14 as shown in detail in FIG. 3, and a head piece 22 worn on the operator's head as shown in detail in FIG. 4. The right glove 18 may include one or more retro-reflective markers 18a-18d, which may typically be round or spherical in shape and may be covered with a retro-reflective material similar to the SCOTCHLITE™ reflective tape made by 3M of St. Paul, Minn. While four reflective markers 18a-18d are shown, it will be appreciated that a greater or lesser plurality of the markers may be used to suit the needs of specific applications. In the present example the left glove 20 similarly may include four retro reflective markers 20a-20d and the head piece 22 may include five retro reflective markers 22a-22e. The gloves 18 and 20 are preferably worn with a specific orientation on the hands to allow the object motion capture system 16 to track the metacarpal plane of each hand. In this example the position and orientation of the fingers of the hands of the operator 14 are not tracked.

It will be appreciated that other articles could be worn on other body parts of the operator 14. For example, shoes on the feet of the operator 14 may include their own retro-reflective markers, or arm bands may be worn by the operator that similarly include one or more retro reflective markers. Thus, the system 10 should not be interpreted to incorporating only the three specifically mentioned operator worn articles 18, 20 and 22. Furthermore, each article 18, 20 and 22 may include virtually any number of markers needed to meet the needs of a specific application.

As will be described in greater detail in the following paragraphs, each UAV 12a and 12b also includes retro reflective markers 44a-44d. However, depending on the specific application, a greater or lesser number of reflective markers 44 may be used, and the illustration of four such markers 44a-44d is meant to illustrate one specific example.

A plurality of light regenerating components 25 may be used that function as the sources of the light that is directed at the retro-reflective markers 18a-18d, 20a-20d and 22a-22e, as well as at the markers 44a-44d on each UAV 12a and 12b. To capture light reflecting off the retro-reflective markers 18a-18d, 20a-20d, 22a-22e and 44a-44d, a plurality of cameras 28 are used. The cameras 28 are each associated with a specific one of the light generating components 25, and each light generating component 25 is preferably placed closely adjacent to a lens of its associated camera 28. The cameras 28 may provide output signals to the motion capture system 16 which analyzes and processes the pixel data from the supplied camera images, which at this point provides a 2D representations of the positions of the retro reflective markers 18a-18d, 20a-20d, 22a-22e and 44a-44d. The motion capture system 16 uses information stored in a memory (not shown) thereof concerning the configuration of each of the markers 18a-18d, 20a-20d, 22a-22e and 44a-44d to generate data that provides a 3D representation of the positions and orientations of all the markers 18a-18d, 20a-20d, 22a-22e and 44a-44d within the environment 15.

The data output from the motion capture system 16 may be provided as an input over a local area network (LAN) 24 to a processing system 26 having a gesture recognition software module 26a and central processing unit (CPU) 26b. The gesture recognition software module 26a is used by the processing system 26 to analyze the 3D position and orientation data and to interpret which commands are being signaled by the operator. The gesture recognition software module 26a uses the 3D position and orientation data along with stored information from a memory (not shown) of the processing system 26 involving various hand and head gestures to interpret which commands are being signaled by the operator 14 through the operator's 14 various hand and head gestures. The processing system 26 then determines the appropriate command signal(s) to send to the UAVs 12a and 12b. The signals may be sent wirelessly using transceivers 32a and 32b that receive outputs from the processing system 26. In one embodiment each transceiver 32a and 32b is associated with a predetermined one of the UAVs 12a and 12b. The transceivers 32a and 32b may be interfaced to the processing system 26 using conventional RC signal converters 29, which in one form may comprise a conventional USB to PPM signal converter assembly.

The cameras 28 may communicate with the motion capture system 16 via a wireless local area network 24. Optionally, a wired network could be employed to facilitate communication between the object motion capture system 16 and the cameras 28.

One three dimensional motion sensing and capture system suitable for use with the present system is commercially available from Vicon of Los Angeles, Calif. The specific motion capture system 16 chosen for use may provide an update rate of at least about 40 Hz, which in many applications will be ample for tracking the UAVs 12. In one embodiment the light generating elements 25 each may comprise circumferential LED light assemblies having 100-200 LEDs that are pulsed at a rate of about 120 Hz, so that the motion capture system 16 is able to provide an update rate of about 120 Hz. The lens of each camera 28 may have a suitable field of view, for example about 60 degrees in one embodiment of the system 10. The cameras 28 provide a high contrast image and the lens of each camera 28 essentially recognizes (i.e., "sees") only reflected light from any one or more of the markers 18a-18d, 20a-20d, 22a-22e and 44a-44d, rather than the light emitted directly from other ones of the light generating components 25. It will be appreciated also that greater or lesser update rates may be needed for monitoring and controlling the motion of other types of objects or devices.

As indicated in FIG. 1, each UAV 12 may include an on-board vehicle control subsystem 34 for controlling the operation of one or more propulsion devices and controls 35 in response to wireless signals received from the transceivers 32. However, depending on the needs of a specific application, each UAV 12 may have a position and orientation control subsystem which differs slightly in its configuration. Thus, while in this example it may be assumed that all of the UAVs 12 have identical vehicle control subsystems 34 with identical propulsion and control subsystems 35, it should be understood that the these subsystems need not be identical.

Referring further to the processing system 26, a navigation software module 38 may be included as part of the processing system 26 for providing navigational directives for each UAV 12. Navigation module 38 may include a Velocity Field Navigation Module 38a and a Virtual Coupling module 38b. Navigation directives may originate from either 38a or 38b. A gesture recognition software module 26a may be used to classify human gestures and to generate high level navigational inputs for the Navigational Software module 38. A low level control signal generator module 41 has an internal feedback control loop (not shown) that receives the operational commands from the vehicle control software module 40 and determines the specific low-level control signals to send to the propulsion devices (e.g., motors and actuators) of each UAV 12a and 12b. These control signals are sent wirelessly by the transceivers 32 to the wireless transceiver 42 of the vehicle control subsystem 34 located on a designated one of the UAVs 12a and 12b. The vehicle control software module 40 and the low level control signal generator may cooperatively be viewed as forming a feedback control subsystem 39.

Figure 5:
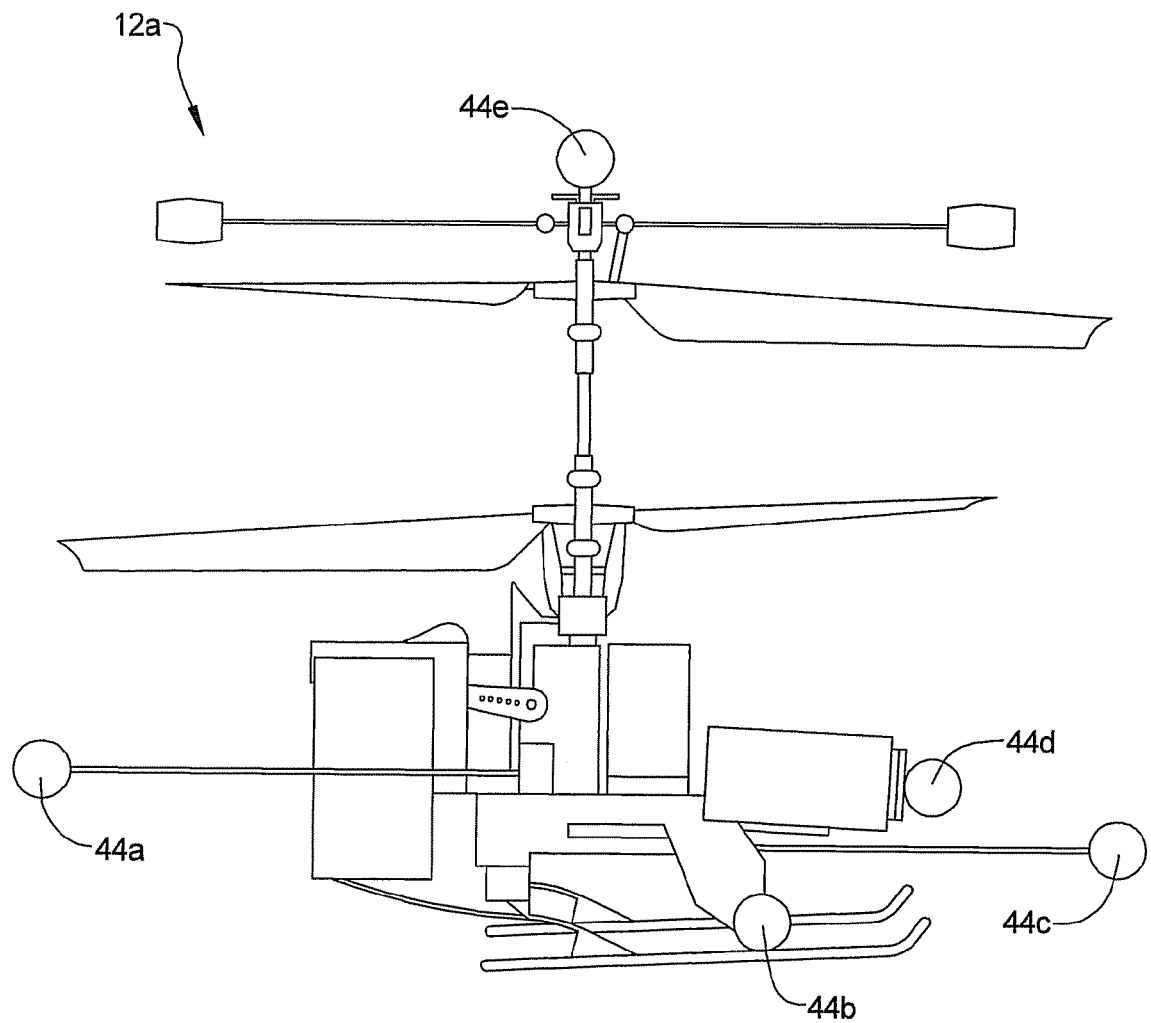
FIG. 5 is a perspective view of an exemplary UAV, in this example a rotorcraft, incorporating a plurality of retro-reflective markers.

Referring further to FIG. 1, as mentioned previously, each UAV 12a and 12b may also include the retro-reflective markers 44a-44e. The markers are also shown in one exemplary implementation on the UAV 12a in FIG. 5. The retro-reflective markers 44 may be disposed at various positions on the UAV 12. The retro-reflective markers 44 may be implemented on the UAVs 12 when they are to be operated within a predetermined flight volume (such as volume 15 in FIG. 1) where pre-located navigation field elements have been calculated to define the boundaries of the area to be monitored. The use of the reflective markers 44 ensures that the UAVs can be tracked within the predetermined volume during their operation. Navigation software 38 provides a collision avoidance capability between the UAVs 12a and 12b themselves, between the UAVs 12a and 12b and the operator, and between the UAVs 12a and 12b and any virtual boundary constraints. These features will be explained further in the following paragraphs.

Figure 6:
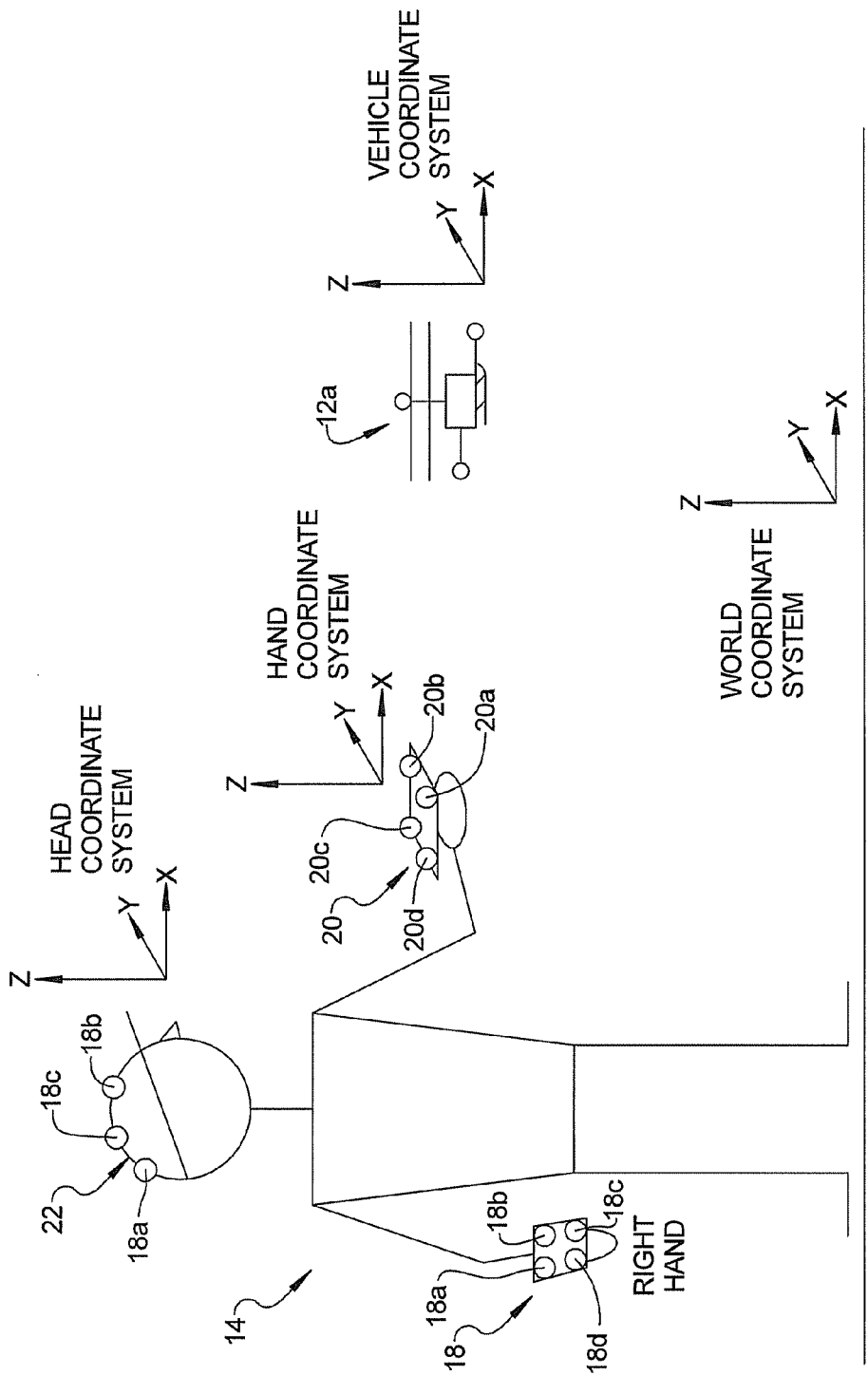

Referring to FIG. 6, each of the articles 18, 20 and 22 are monitored in position and orientation with a common three dimensional coordinate system. Thus, for example, the head worn article 22 is referenced to a coordinate system having an X axis, a Y axis and a Z axis. The gloves 18 and 20 are similarly referenced to the same coordinate system.

The various gestures that may be used to control the operation of the UAVs 12 are set forth below:

Hand Raised: This is the gesture a student might use in a class in order to speak to the professor. The hand is held above the head as shown in FIG. 7. This gesture is used to signal to the system that an operator wishes to begin a gesture dialog with the system.

Point: This gesture is used to indicate an object of interest, usually done with the index finger outstretched, as indicated in FIG. 8. However, in this implementation, the finger movement is ignored. The object motion capture system 16 computes a conically shaped area 48 that gives the operator 14 a method of narrowing the scope of subsequent selection gestures.

Time Out: This gesture is typically used in sporting events to stop an ongoing game. Both hands are used to form a "T" shape as shown in FIG. 9. The object motion capture system 16 recognizes this command as a command to stop recognizing further commands with the exception of the Hand Raised command. A Selected UAV (or UAVs) responds to this command by ignoring further gestures by the operator 14 other than the Raised Hand gesture of FIG. 7.

Track Mode On: This gesture is inspired by the circular gesture one would make when one wants to ensure oneself that a computer mouse input device is active. It consists of moving the hand in a small radius (typically less than 10 cm radius) circular motion in the horizontal (X,Y) plane as shown in FIG. 10. In the case of a typical desktop computer, the cursor movement will provide the response required to "wake up" the desktop. However, in the present system 10, this hand motion forms a command to the selected UAV(s) 12 to move in response to this command.

Track On: This gesture is shown in FIG. 11 and is performed by holding the hand horizontally and in front of oneself as if on a table top, and mimics the motion of a computer mouse input device with the addition of a vertical (Z) component. The Z-axis of the hand is parallel to the Z-axis of the coordinate system. The object motion capture system 16 responds by tracking the hand with the selected UAV 12 when in Track Mode.

Track Off: This gesture is illustrated in FIG. 12 and is done by holding the hand vertically and in front of oneself as one does when offering one's hand to shake. The Z-axis of the hand is perpendicular to the Z-axis of the world coordinate system. The object motion capture system 16 responds by no longer tracking the hand with the UAV 12 when in Track Mode.

Stop: This is the gesture a police officer would use when directing traffic in order to halt vehicles. It is illustrated in FIG. 13. The object motion capture system 16 computes a selected conical area 50 but using the z-axis of the hand with the −Z direction pointed in the direction of the UAV 12 (or UAVs) the operator 14 desires to stop.

Move: This is the gesture a police officer would use when directing traffic in order to cause vehicles to move. It is shown in FIG. 14. The object motion capture system 16 computes a conical area 52 using the −Z direction as the direction the operator 14 desires the UAV 12 (or UAVs) to move. The selected UAV 12 (or selected UAVs) will then move in the indicated direction.

Head Nod: This gesture is shown in FIG. 15 and is a gesture that one commonly uses to indicate agreement. The head of the operator 14 is rotated about its Y-axis and is used to confirm a UAV 12 selection.

Head Shake: This gesture is shown in FIG. 16 and is the gesture one commonly uses to indicate disagreement. The head of the operator 14 is rotated about its Z-axis and is used to reject a UAV 12 selection.

Next: This gesture is shown in FIG. 17 and is the gesture one often uses to indicate to a speaker that time is running out and they should speed up their talk. The sweep of the x-axis of the operator's 14 hand will form a circular conical area 54 in this rotating gesture. The direction of the rotation is clockwise for the right hand and counterclockwise for the left hand. The object motion capture system 16 responds by selecting UAVs 12 within the current selection cone scanning left to right, top to bottom and front to back in Normal Mode.

Previous: This gesture is shown in FIG. 18 and is the gesture one often uses to indicate to a speaker that they should go back to a previous topic in their talk. It is identical to the Next gesture but with the rotation of the operator's 14 hand in the opposite direction. The sweep of the X-axis of the hand is interpreted as a command by the object motion capture system 16 to select a conical area. The direction of the rotation of the hand is counterclockwise for the right hand and clockwise for the left hand. The object motion and capture system 16 responds by selecting UAVs 12 within the currently selected conical area and scans from back to front, bottom to top and left to right in Normal Mode.

Group: This gesture is shown in FIG. 19 and is the gesture one would make when putting the hands together in prayer. The right and left hands are put together palm to palm. The object motion capture system 16 interprets this as a command to group the UAVs 12 that are currently selected as a distinct group.

Ungroup: This gesture is shown in FIG. 20 and made by rolling the palms of the hands together in a circular motion, as if rolling a ball of clay, and then separating the hands. This motion symbolizes breaking bonds and then taking the hands away from each other to symbolize dispersal. The right and left hands are put together palm to palm, their Z-axes synchronously orbiting around a common point with 180° phase angle maintained between them (i.e., palm to palm). The object motion capture system 16 responds by ungrouping any UAV 12 that is currently selected from its previously assigned group.

Figure 21:
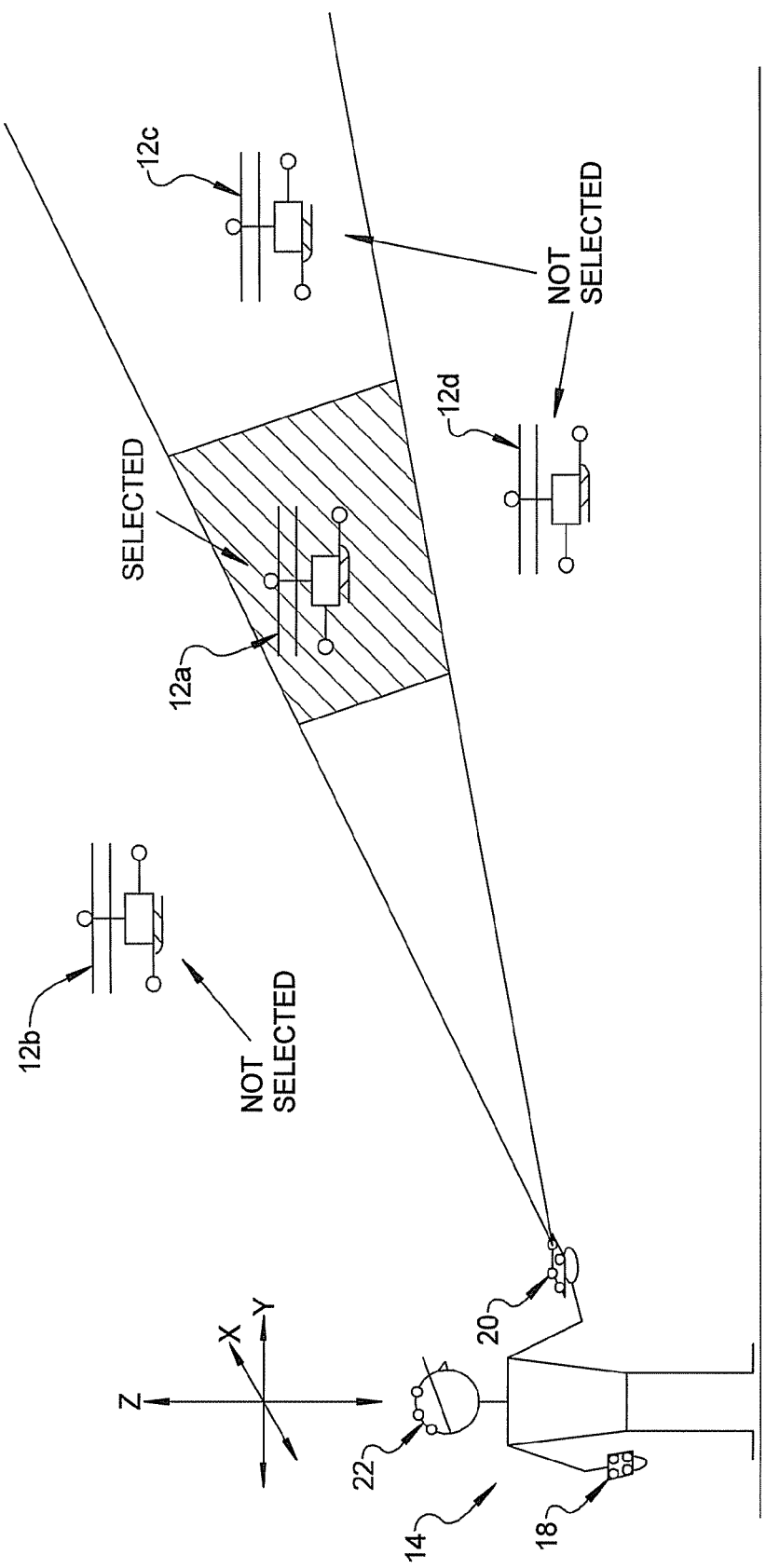
FIG. 21 is a perspective view illustrating an exemplary selection cone (i.e., conical three dimensional area) that an operator may select through a specific gesture, together with the position and orientation of the operators hand and head relative to their respective coordinate systems.

An implicit operator selected conical area (i.e., selection cone) is illustrated in FIG. 21 and indicates to the object motion capture system which UAVs 12 in the operator's 14 environment are candidates for selection. It will be appreciated that there are two possible implicit operator selection cone configurations. The first is as illustrated in FIG. 21 (and also FIG. 8) and projects along the +X-axis of the operator's hand. The second implicit operator selection cone configuration is a cone projected from the palm of the operator's 14 hand in the hand's +Z axis direction or −Z axis direction as shown in FIG. 13. Thus, two possible selection cones, but used with different commands, may be created. Disambiguation between the operator's intentions to use the hand's X-axis selection cone or the hand's Z-axis selection cone is done by using the position and orientation of the operator's 14 head. The head's+X-axis is assumed to be pointed in the same direction as the desired selection cone. Thus in FIG. 21, the X-axis of the operator's 14 head and the X-axis of the operator's hand are in the same general plane, which the system 16 interprets that the +X axis is the direction that the operator desires the selected cone to extend. Additionally, in the case of the use of the hand's Z-axis selection cone, the head's+X-axis is used to determine if the selection cone is pointed in the hand's+z or −z axis direction, the selected cone direction being made to match the given head direction.

Velocity Field Navigation

Figure 22:
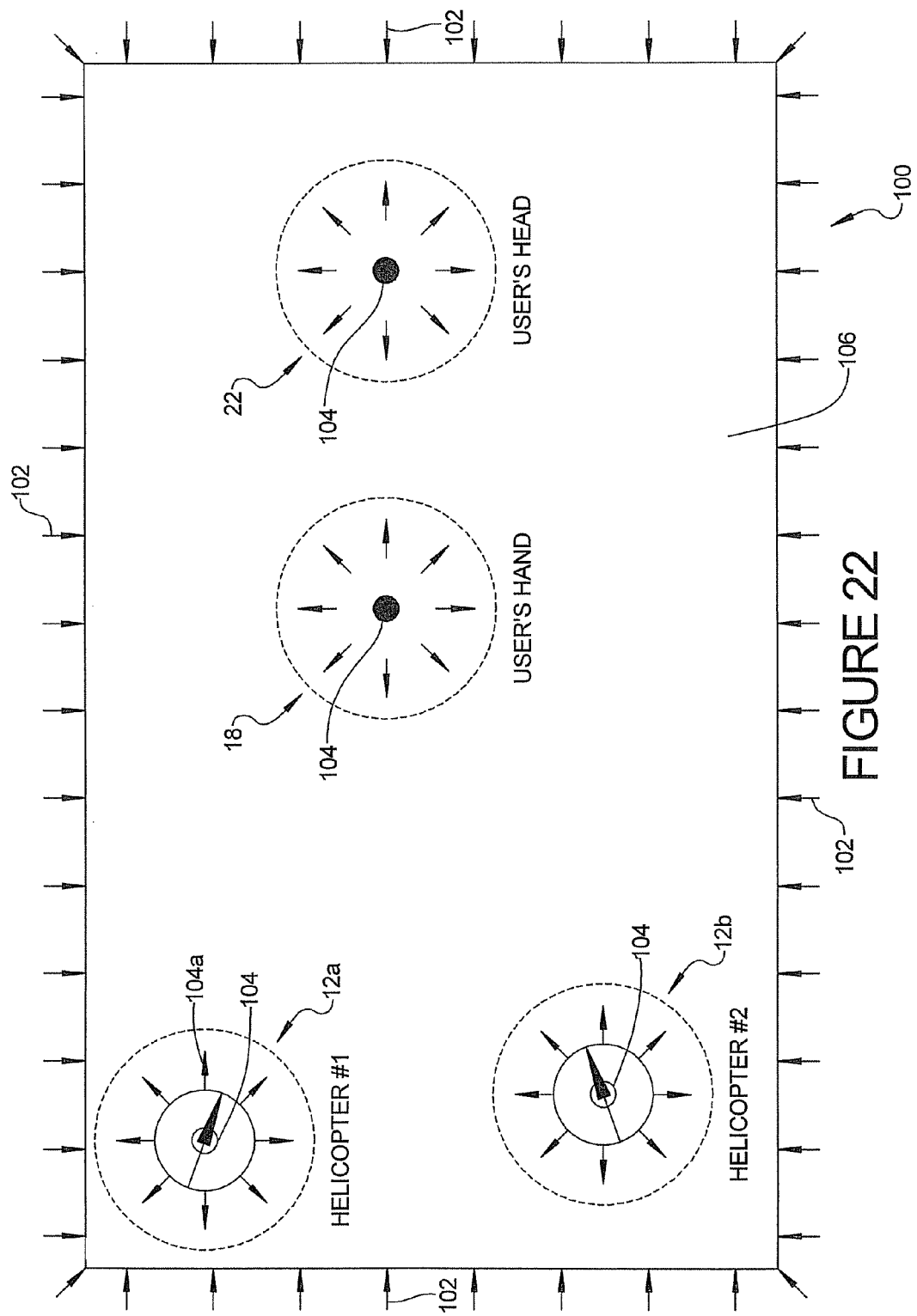
FIG. 22 is a two dimensional illustration of a collision avoidance repulsion field that may be implemented to assist with flight envelope protection and autonomous flight of the UAVs within a predetermined region.

For autonomous flight one option is to assist in ensuring that the UAVs 12 are contained within a predefined area is to generate a constraint volume 100 as shown in FIG. 22. The constraint volume 100 uses a potential field navigation function to move the goal point, used for the direction of motion of the UAV 12, along its gradient. The guidance and navigation outer loop is coupled with a stabilization inner loop which controls the low-level response of the UAV 12 to external disturbances, as well as the guidance inputs provided by the gesture recognition software module 26a. This is a closed-loop feedback control system that uses the measured position and orientation data provided by the motion capture system 16 to regulate the UAV 12 motion. At every position in the potential field a velocity vector 102 is defined with its direction and magnitude based on the combined effect of individual navigational field elements. Such elements may be formed by, for example, physical and virtual boundaries, moving or stationary objects to avoid, and target positions or way points to move towards. These elements can be defined or repositioned by a human supervisor, an autonomous agent, or other higher-level source. Each UAV 12a and 12b, as well as the operator 14, may be outfitted with a repulsive point source device 104 that generates a plurality of repulsive field lines, represented by arrows 104a, around its full circumference. FIG. 22 shows a two dimensional version of the potential field with repulsion point sources 104 and repulsive walls formed by the velocity vectors 102. In practice, repulsion point sources and walls may be used to create protective envelopes around objects whose geometric shapes correspond to points and surfaces. Clearly other geometric figures may be used as well to create envelopes around real world objects with other shapes.

Figure 23:
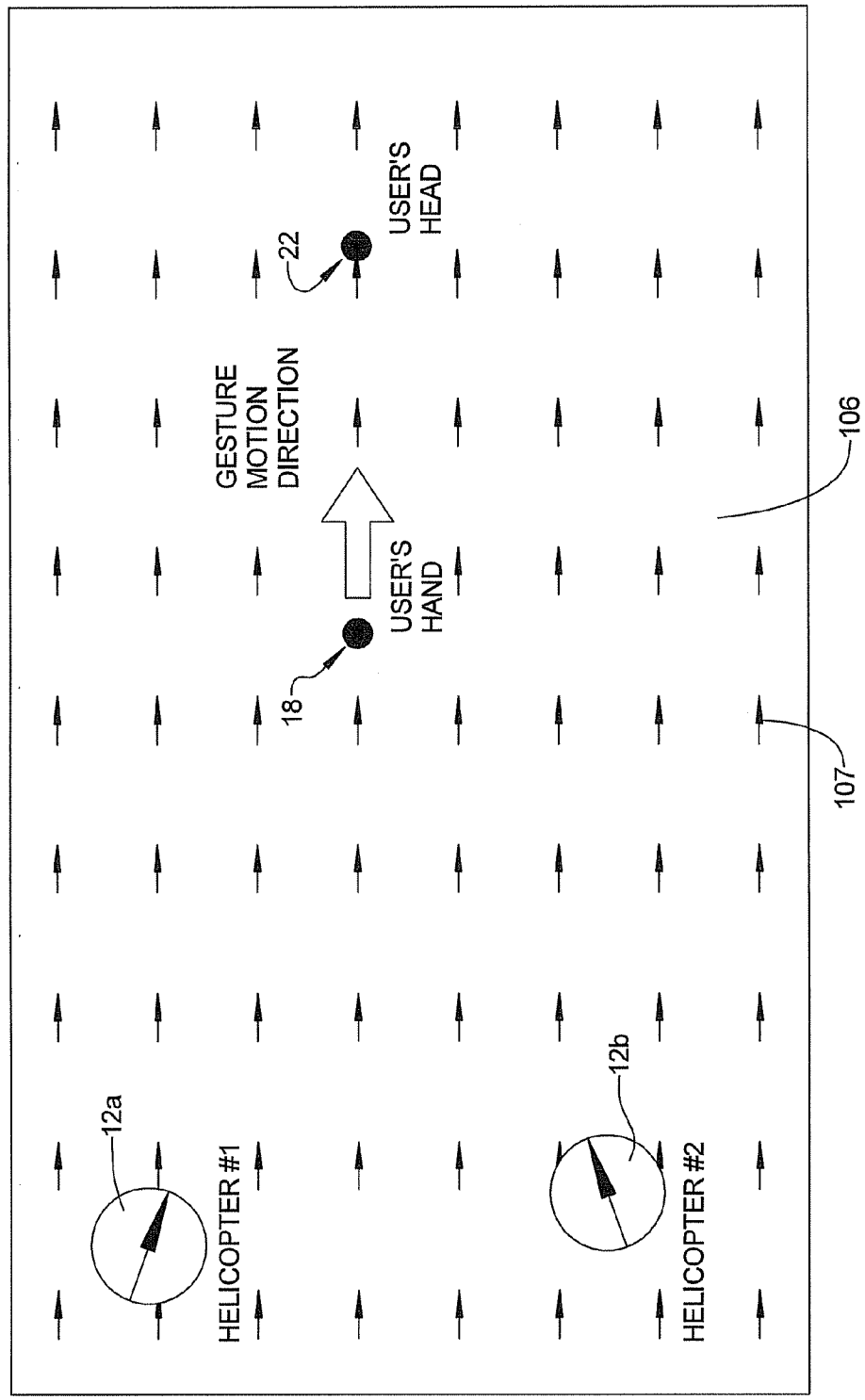
FIG. 23 is a two dimensional illustration of a motion gesture constant field implemented by a suitable gesture control with the hand of the operator.
Figure 24:
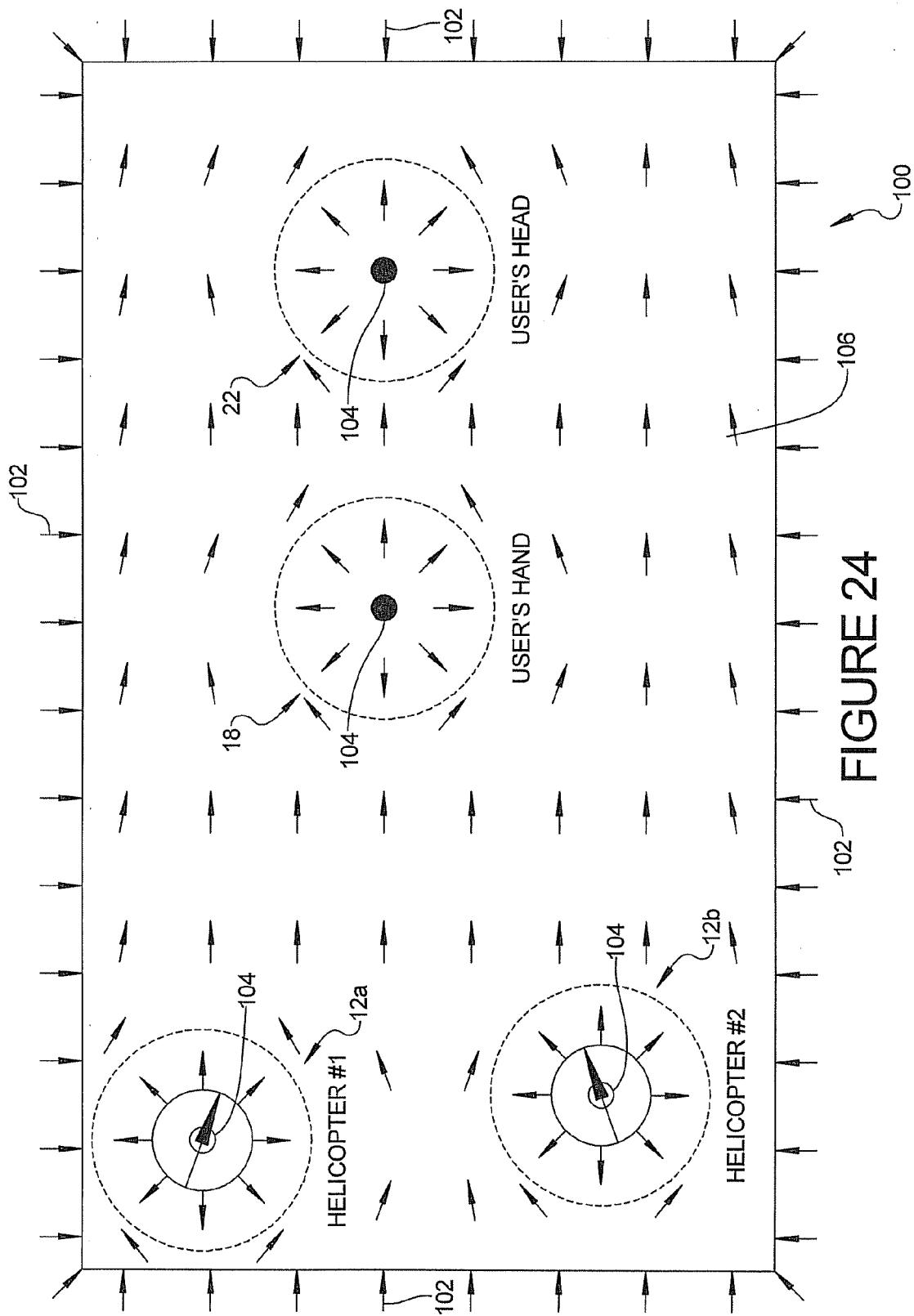
FIG. 24 is a two dimensional illustration of the repulsion field and the motion gesture constant field combined into a composite navigation field.

FIG. 23 illustrates the combination of gesture based teleoperation and potential field navigation. The human operator 14 issues a motion gesture which generates a constant velocity field on the part of the UAVs 12a and 12b in the direction of arrows 107. Arrows 107 indicate the direction of motion of the UAVs 12 within a predetermined motion capture volume 106. The repulsive containment field formed by the velocity vectors 102, the repulsive collision avoidance fields formed by the repulsive point sources 104 and the constant directed motion fields are combined as shown in FIG. 24. The combination of these systems provides an effective teleoperation capability for the operator 14 while also maintaining a protective envelope about the operator 14. It also ensures that the UAV(s) 12 will not escape the motion capture volume 106 of the predefined environment or possibly collide with one another or the operator 14.

It will be appreciated that when generated, field components must be given a scope in which they are to be applied. Some field components, such as the repulsive containment field represented by velocity vectors 102 that form the motion capture volume 106, include all autonomous UAVs 12 in their scope. Other field components, such as the constant fields associated with motion commands, are applied only to the currently selected UAV(s) 12 for the operator 14 issuing the motion command. Accordingly, the field of the navigation function is a weighted linear combination of fields both shared by all UAVs 12 in the operator environment and those targeting a given particular UAV 12. This produces several distinct behaviors, namely, containment in the motion capture volume; point-to-point navigation; collision avoidance with other vehicles; and teleoperation through a variety of mechanisms including gesture control.

Figure 25:
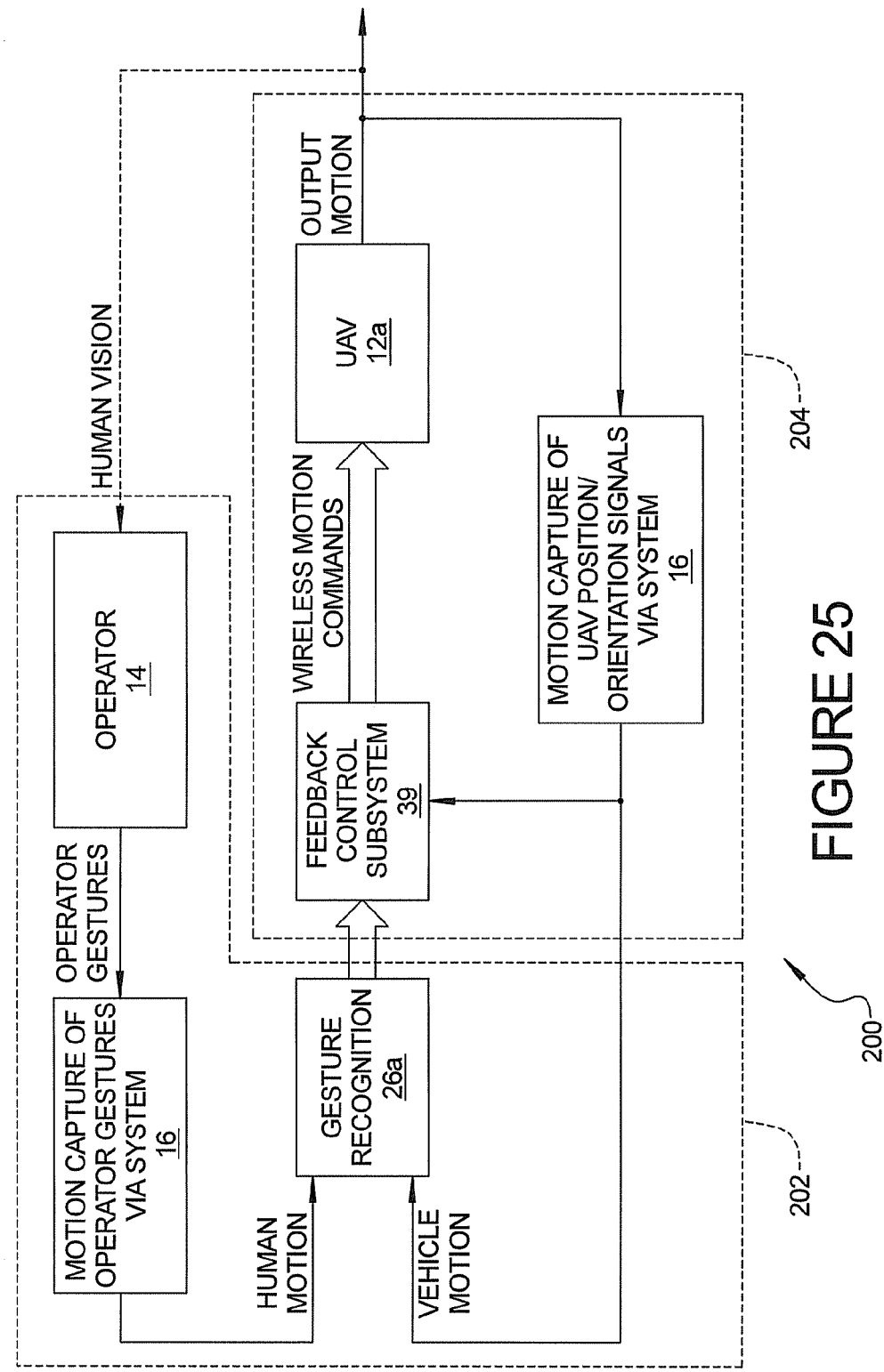
FIG. 25 is a block diagram illustrating in more detail the inputs used by the system and the control feedback loop implemented for enabling gesture based control of the UAVs.

FIG. 25 shows a feedback diagram 200 for the presently described embodiment using gesture-based control of rotorcraft acting as the UAVs 12. It consists of a gesture motion sensing and recognition loop (hereinafter "outer control loop") 202 on the upper left side of the diagram feeding UAV 12 input states to an inner feedback control and stabilization loop (hereinafter "inner control loop") 204 on the lower right. The inner control loop 204 uses position and orientation data from the motion capture system 16 to calculate the command signals to send to the UAV 12. One embodiment of the present disclosure may use proportional-integral-derivative (PID) control to generate the required vehicle command signals.

The UAV 12 inner control loop 204 may update at a constant rate, but the outer control loop 202 update rate can range from a first rate that is synchronized with the inner control inner loop 204 for direct position control tasks, to a second (i.e., lower), asynchronous rate for other tasks like mode or way-point selection. The gesture input is based on the gestures by the operator 14 as described herein, and sensed by the motion capture system 16. The operator 14 selects which gesture to perform based on the desired task as well as reactions to the environment in which the UAVs 12 are operating.

The rotorcraft (i.e., UAV 12) control model used in this example implementation may be a point mass model with decoupled PID feedback 204. Independent controllers may be implemented for each controlled degree-of freedom: X, Y, Z, and Yaw. The feedback control subsystem 205 may include the PID elements for a single controlled degree-of-freedom. This works well for small changes in velocity and acceleration (i.e. quasi-static motion). The pendulum-like motion of the center of mass hanging below each UAV's 12 center of lift causes oscillations about the X and Y axes of the UAV 12 (pitch and roll) when velocity is changed suddenly, but this oscillation dies out quickly due to the damping effect of the stabilization linkage on the upper rotor of the UAV 12.

The inner control loop (i.e., low-level stabilization control loop) 204 requires a desired goal position and velocity as its input from the outer (i.e., high-level task definition) control loop 202. In order to define this goal state for the inner control loop 204, the velocity field can be sampled at the current location of the UAV 12 and used to generate the goal position for the next time step (P=VΔt). At each new position the velocity field is sampled and generates a new goal state that is applied to the low-level control loop 204 at the next update.

Figure 26:
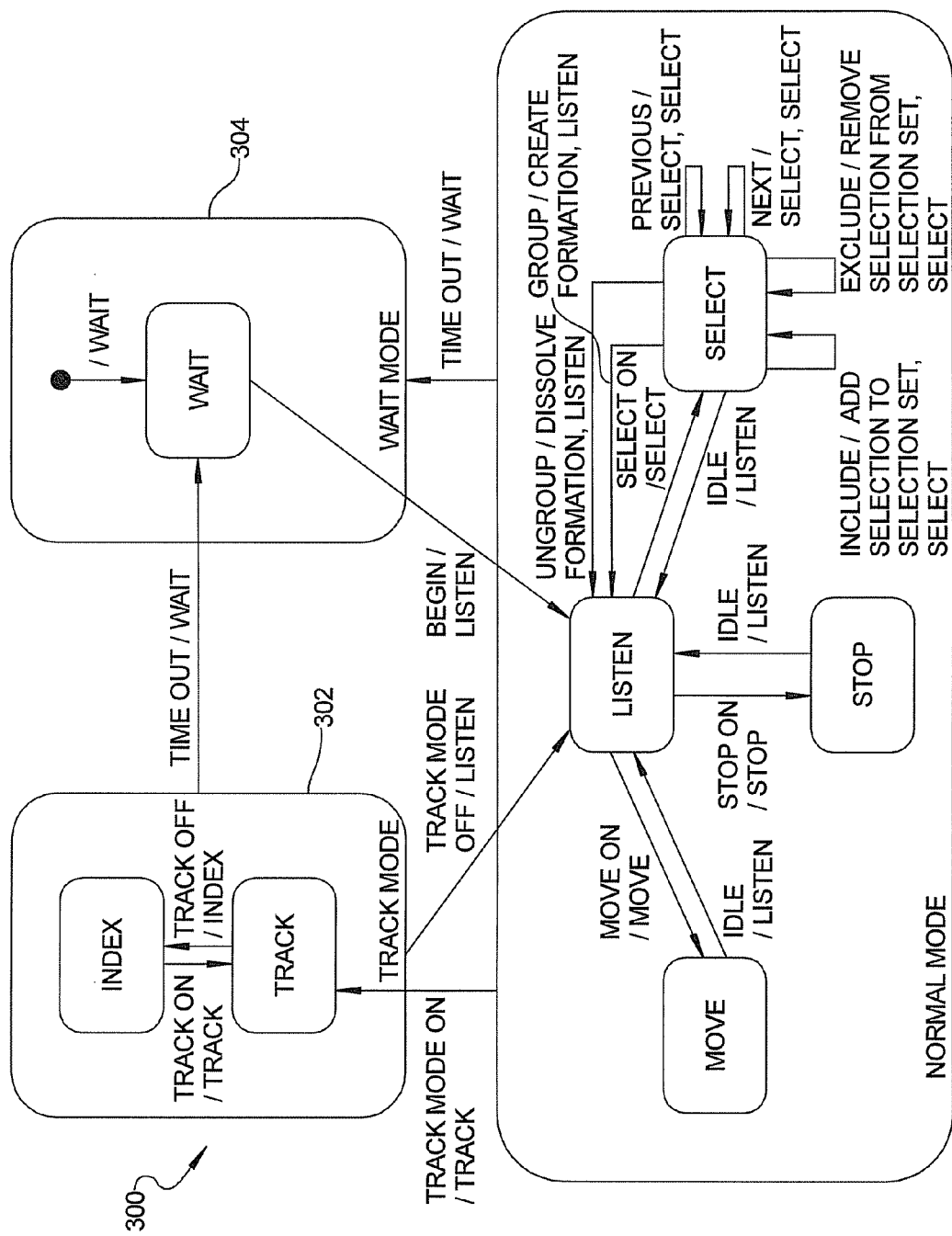
FIG. 26 is a diagram illustrating certain ones of the gesture commands that may be used to in each of the Track Mode, Wait Mode and Normal Modes of operation of the system.

FIG. 26 represents a finite state model 300 of the system 10. The model 300 may implement three distinct gesture input modes: Track Mode 302, Wait Mode 304, and Normal Mode 306. In principle, a three-mode system offers three times the number of gestures that the operator 14 can have available for distinct human-robot interactions. The Track Mode 302, Wait Mode 304, and Normal Mode 306 boxes represent superstate modes in the model 300. Superstates are states that contain a collection of substrates in standard state transition models. In principle, the same gesture may potentially mean different things in different modes. So a head nod while operating in Track Mode 302 can be used to switch to Normal Mode, since hand gestures in Normal Mode 306 will pantomime movements of the autonomous vehicles. In Normal mode 306, the same head nod can be used like a mouse click of a computer mouse to confirm an activity such as the "Include" selection shown the Normal Mode 306 subsection in FIG. 26. Another gesture which can be used with different means in different modes is the Hand Raised gesture (also shown in FIG. 7). In the Wait Mode 304, the Hand Raised gesture signals the beginning of the operator 14 gesture dialog with the system 10, moving the system state from "WAIT" in the Wait Mode 304 to "LISTEN" in the Normal Mode 306. In the Normal Mode 306, a hand raised can signal a stop command moving the system from LISTEN state to STOP state. In the "Track Mode" 302, the "Index" designation indicates that when the "Track On" features is selected, for example, the operator 14 moving a hand towards her/him may cause the selected UAV 12 (or UAVs, if more than one is selected) to move toward the operator 14. Then issuing a "Track Off" command will interrupt the communication with the UAV 12 (or UAVs), which allows the operator to re-extend her/his arm fully, whereupon the "Track On" command can be given again, and then the operator 14 can again move her/his arm towards herself/ himself. This allows the position or motion of the UAV(s) 12 to indexed, and thus moved over any distance by repeatedly having the operator 14 his her/his hand over just a relatively short distance.

By way of example and referring to FIGS. 26 and 7-20, the following sequence of gestures may be used to begin and carry out a dialogue with two autonomous UAVs 12. The following sequence of gestures may be used to move the group toward the operator 14, place the group above the operator and terminate the dialog with the system 10.

Starting with the assumption that there is a collection of autonomous UAVs 12 (for example mini-rotorcraft) hovering in a fixed position at one end of a predefined motion capture region, the operator 14 begins the dialog with the system 10 by moving into the predefined region 14 wearing the motion capture head piece 22 and gloves 18 and 20, and raising one hand above his head (FIG. 7). The system 10 now enters Normal Mode 306 (FIG. 26). The operator 14 wants to select three UAVs 12, two from the left hand side of the collection and one from the right hand side. The operator 14 raises the left hand and points in the direction of the two UAVs 12 on the left (FIG. 8) and begins making the "Next" gesture with the right hand (FIG. 17). Then each UAV 12 in the selection cone (FIG. 21) moves up and down slightly as each one is selected. The operator 14 gives the Head Nod gesture, (FIG. 15) when the selection scan reaches the desired UAVs 12. When both of the desired UAVs 12 on the left are selected the operator 14 points the selection cone in the direction of the desired UAVs 12 on the right, repeating the above operation until all three of the desired UAVs are selected. The operator 14 then issues the Group gesture (FIG. 19) grouping the three selected UAVs 12 into a formation. The operator 14 then issues a Move gesture (FIG. 14) in the operator's 14 direction followed by a Stop gesture (FIG. 13) when the three UAVs 12 have come close enough to the operator. The operator 14 then enters the Track Mode by issuing the Track Mode On gesture (FIG. 10). The operator 14 then raises the tracking hand overhead keeping it horizontal and then issues a Track Off gesture (FIG. 12), lowers the hand, issues a Track On gesture (FIG. 11), and raises the hand overhead again. The three UAVs 12 are now well above the operator's head. The operator 14 issues a Head Nod gesture (FIG. 15) placing the system 10 out of Track Mode and back into Normal Mode. The operator then issues the Time Out gesture (FIG. 9) and moves out of the predefined motion capture region.

Implicit in the above scenario are a handful of assumptions about the effects of gestures over time. For example, while forming a group, included UAVs 12 remain included, even if no longer within the current cone of selection. This is so until they are either excluded or until the Group gesture is issued, at which time the resulting formation becomes one entity. Once set in motion by a motion gesture, the UAVs 12 follow the velocity field gradient until they are commanded otherwise. The velocity of the selected UAVs 12 can be made faster or slower proportional to the frequency of the cyclical hand motion.

Both the Motion (FIG. 14) and Stop (FIG. 13) gestures may be used with default vehicle selections. Clearly the operator 14 should not be forced to do a lengthy set of selection gestures when attempting to stop a collection of UAVs 12 from moving. In this case, the Motion or Stop gesture may apply simply to the UAVs 12 which are currently in the cone of selection. The strength of the resulting velocity field is descending the further away from the operator 14 the target vehicle is but the operator can adjust this by increasing or decreasing the amplitude (i.e., expansiveness) of the gestures.

Figure 27:
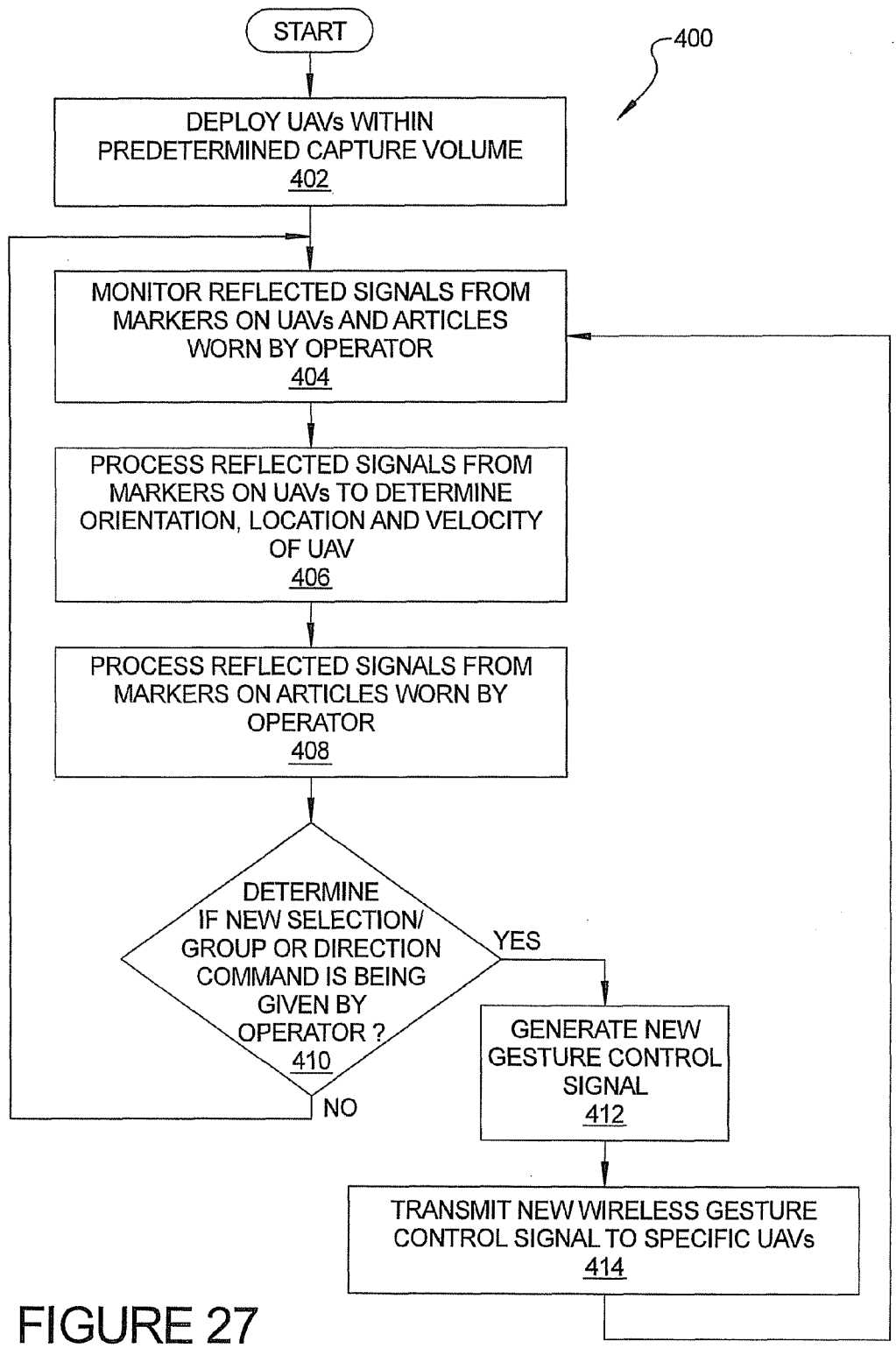
FIG. 27 is a flow diagram of major operations that may be performed by the system of FIG. 1.

Referring to the flow diagram 400 of FIG. 27, major operations 402-414 are illustrated that may be performed by the system 10.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for controlling at least one remotely operated unmanned object, comprising:
    defining a plurality of body movements of an operator that correspond to a plurality of operating commands for said unmanned object;
    optically illuminating the unmanned object and an article worn by the operator;
    optically illuminating a marker on said unmanned object;
    sensing said body movements of said operator by first optical reflections from said article, and sensing movements of said unmanned object by second optical reflections from said unmanned object;
    based on said reflected first and second optical signals, generating said operating commands; and
    transmitting signals that correspond to said operating commands to said unmanned object to control operation of said unmanned object.

2. The method of claim 1, wherein defining a plurality of body movements of an operator that correspond to a plurality of operating commands comprises defining a hand position of said operator as a stop command.

3. The method of claim 1, wherein defining a plurality of body movements of an operator that correspond to a plurality of operating commands comprises defining a hand motion of said operator as a command for said unmanned object to move in a predetermined direction.

4. The method of claim 1, wherein said defining a plurality of body movements of an operator that correspond to a plurality of operating commands for an unmanned object comprises defining a plurality of body movements that correspond to a plurality of operating commands for an unmanned vehicle.

5. The method of claim 1, further comprising using a plurality of unmanned objects; and
    wherein said defining a plurality of body movements of an operator that correspond to a plurality of operating commands comprises defining a motion of the head of the operator as a command to select a specific one of said unmanned objects to be controlled.

6. The method of claim 5, wherein defining a head motion of the operator comprises defining a side to side rotation of said head as a command to reject a selection of a specific one of said unmanned objects, and wherein an nodding motion of said head defines a command to confirm a selection of a specific one of said unmanned objects as being a recipient of further commands of from said operator.

7. The method of claim 1, wherein defining a plurality of body movements of an operator that correspond to a plurality of operating commands comprises defining a circular hand motion in a plane, said circular hand motion defining a command to cause said unmanned object to begin moving from a stationary condition.

8. The method of claim 1, wherein defining a plurality of body movements of an operator that correspond to a plurality of operating commands comprises using both hands of said operator to form a T shape, to designate a command that causes said unmanned object to ignore subsequent commands.

9. The method of claim 1, wherein defining a plurality of body movements of an operator that correspond to a plurality of operating commands comprises defining a position of a hand of said operator being positioned over the head of said operator as a command to begin a dialog with said unmanned object.

10. The method of claim 1, wherein controlling said unmanned object comprises controlling a plurality of unmanned objects; and
wherein defining a plurality of body movements of an operator that correspond to a plurality of operating commands comprise defining a pointing motion of one hand of said operator as defining a three dimensional conical area, and wherein further commands by said operator are limited to ones of said unmanned objects present within said conical area.

11. The method of claim 1, wherein said controlling an unmanned object comprises controlling a plurality of unmanned objects; and
wherein defining a plurality of body movements of an operator that correspond to a plurality of operating commands comprises defining the placement of the palms of the hands of the operator together against one another as a command to group a plurality of ones of said unmanned objects together as a group, to enable said group of unmanned objects to be controlled by subsequently received commands from said operator.

12. The method of claim 1, wherein said controlling an unmanned object comprises controlling a plurality of unmanned objects; and
wherein defining a plurality of body movements of an operator that correspond to a plurality of operating commands comprises defining a circular motion of a hand of said operator about an axis of a coordinate system associated with the hand as a command that defines a three dimensional conical area and selects only specific ones of said unmanned objects that are present within said conical area, and that selects said ones of said unmanned objects in a predetermined spatial order.

13. The method of claim 12, wherein said predetermined spatial order comprises one of:
top to bottom, front to back, and left to right; and
back to front, bottom to top and left to right.

14. The method of claim 1, wherein said controlling said unmanned object comprises controlling an unmanned airborne vehicle (UAV).

15. The method of claim 14, wherein controlling an unmanned airborne vehicle comprises controlling an unmanned rotorcraft.

16. A method for controlling operation of an unmanned vehicle, comprising:
providing an unmanned vehicle having a plurality of optically reflective markers thereon;
defining at least one gesture of a body part of an operator that corresponds to an operating command for controlling motion of the unmanned vehicle;
using an article worn by an operator, the article having optically reflective markers, to enable the operator responsible for remotely controlling operation of the unmanned vehicle to signal the gesture through movement of the article;
optically illuminating the unmanned vehicle and the article worn by the operator;
sensing optical reflections from the markers of the unmanned vehicle and the markers on the article;
using a motion capture system to interpret the sensed optical reflections and to generate data representing a position of the unmanned vehicle and a motion of the article; and
processing the data to interpret the gesture being given by the operator via motion of the article and to determine a position of the unmanned vehicle, and to generate a command for controlling the unmanned vehicle in accordance with the gesture; and
wirelessly transmitting the command to the unmanned vehicle.

17. A system for remotely controlling at least one unmanned vehicle through body movements of an operator, the system comprising:
an article worn on a body part of said operator, the article having a first plurality of optically reflective markers secured thereto;
a second plurality of optically reflective markers secured to said unmanned vehicle;
a plurality of lights for illuminating the first and second pluralities of optically reflective markers;
a motion capture system for optically tracking a position and an orientation of said article via first reflected optical signals from said first plurality of optically reflective markers, and a position and orientation of said unmanned vehicle via second reflected optical signals from said second plurality of optically reflective markers, and generating data representing positions of each of said first and second pluralities of optically reflective markers;
a processing system adapted to process the data from said motion capture system and to generate commands for controlling motion of the unmanned vehicle, the processing system including:
a gesture recognition module for interpreting portions of said data received from said motion capture system that define positions and orientations of said first plurality of markers on said articles being worn by said operator, as predefined operating commands to be provided to said unmanned vehicle; and
a feedback control subsystem that receives the navigation signals from the gesture recognition module and generates low-level vehicle control commands for controlling the unmanned vehicle.

18. The system of claim 17, further comprising a transmitter for wirelessly transmitting the low level vehicle control commands to the unmanned vehicle.

19. The system of claim 17, wherein the unmanned vehicle includes a control system for receiving the wirelessly transmitted low level vehicle control commands.

20. The system of claim 17, wherein said article comprises at least one of an article worn on a hand of said operator and an article worn on a head of said operator.

* * * * *